(12) United States Patent
Zhu

(10) Patent No.: US 12,488,722 B2
(45) Date of Patent: Dec. 2, 2025

(54) PIXEL DRIVE CIRCUIT AND TIMING CONTROL METHOD THEREFOR, AND DISPLAY PANEL

(71) Applicant: Guangzhou China Star Optoelectronics Semiconductor Display Technology Co., Ltd., Guangdong (CN)

(72) Inventor: Maoxia Zhu, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 18/542,941

(22) Filed: Dec. 18, 2023

(65) Prior Publication Data

US 2025/0046227 A1 Feb. 6, 2025

(30) Foreign Application Priority Data

Jul. 31, 2023 (CN) .......................... 202310958271.7

(51) Int. Cl.
*G09G 3/20* (2006.01)
*G09G 3/32* (2016.01)

(52) U.S. Cl.
CPC ......... *G09G 3/2014* (2013.01); *G09G 3/2025* (2013.01); *G09G 3/32* (2013.01); *G09G 2300/043* (2013.01); *G09G 2300/0819* (2013.01); *G09G 2300/0842* (2013.01); *G09G 2310/08* (2013.01); *G09G 2320/0233* (2013.01); *G09G 2320/045* (2013.01)

(58) Field of Classification Search
None
See application file for complete search history.

(56) References Cited

U.S. PATENT DOCUMENTS

| | | | |
|---|---|---|---|
| 10,885,843 B1* | 1/2021 | Lu | G09G 3/3233 |
| 2007/0007535 A1* | 1/2007 | Tang | H10D 86/40 |
| | | | 257/E27.111 |
| 2017/0132965 A1* | 5/2017 | Hsu | G09G 3/2003 |
| 2018/0033373 A1* | 2/2018 | Hong | G09G 3/3233 |
| 2018/0182279 A1* | 6/2018 | Sakariya | G09G 3/2088 |
| 2018/0233082 A1* | 8/2018 | Wang | G09G 3/3233 |
| 2019/0139488 A1* | 5/2019 | Wang | G09G 3/3266 |
| 2023/0073636 A1* | 3/2023 | Kim | G09G 3/3266 |
| 2024/0169892 A1* | 5/2024 | Huo | G09G 3/3233 |

* cited by examiner

*Primary Examiner* — Dorothy Harris
(74) *Attorney, Agent, or Firm* — PV IP PC; Christopher S. Ruprecht; Wei Te Chung

(57) ABSTRACT

Disclosed are a pixel drive circuit and a timing control method therefor, and a display panel. The pixel drive circuit includes: a drive module; a pulse modulation module configured to be enabled based on any one of a first scanning signal and a second scanning signal, convert a data drive signal into a modulation signal of a drive current, and provide the modulation signal to the drive module; and a light-emitting device. The drive module is connected to the pulse modulation module and the light-emitting device, to control on-off of the drive current based on the modulation signal to control the light-emitting device to emit light. The pulse modulation module includes a dual-gate transistor.

10 Claims, 3 Drawing Sheets

PIXEL DRIVE CIRCUIT AND TIMING CONTROL METHOD THEREFOR, AND DISPLAY PANEL

CROSS-REFERENCE TO RELATED APPLICATION

This application claims priority to Chinese Patent Application No. 202310958271.7, filed in the China National Intellectual Property Administration on Jul. 31, 2023, entitled "PIXEL DRIVE CIRCUIT AND TIMING CONTROL METHOD THEREFOR, AND DISPLAY PANEL", the entire contents of which are incorporated herein by reference.

FIELD OF INVENTION

The present disclosure relates to the field of display technologies, and in particular, to a pixel drive circuit and a drive method therefor, and a display panel.

BACKGROUND OF INVENTION

A Micro light-emitting diode (LED) is a new display technology that includes tiny LEDs, and each of the LEDs can emit light independently. Compared with traditional liquid crystal display and organic light-emitting diode (OLED) technology, the Micro LED has higher luminance, a higher contrast, and a faster response speed. Due to complexity and high costs of a Micro LED technology, currently, the Micro LED technology is mainly used in high-end display products, such as a large TV, a display wall, and a virtual reality device.

There are two common pixel drive modes for a Micro LED display panel, namely, pulse amplitude modulation (PAM) drive and pulse width modulation (PWM) drive. The PAM drive is to control a drive current of a light-emitting device in each pixel unit to implement display of different luminance. However, the PAM drive mode has a problem of color point shift at low grayscale, resulting in affecting a display effect; and the PWM drive is to control light-emitting time of a light-emitting device in each pixel unit implements display of different luminance. However, the PWM drive mode has higher requirements on a gate driver chip (Gate IC). Therefore, combined advantages of the PWM drive mode and the PAM drive mode, a person skilled in the art designed a pulse hybrid modulation (PHM) hybrid circuit. The PWM drive is used at low grayscale, and the PAM drive is used at high grayscale. The PHM hybrid circuit includes a PWM drive transistor.

Because space of a Micro LED circuit layout is limited, and a development trend of a future Micro LED product is that a pitch continues to decrease, how to simplify PHM drive while being compatible with a size requirement of a smaller pitch is a problem that is required to be resolved by the person skilled in the art.

SUMMARY OF INVENTION

In view of the above, embodiments of the present disclosure provide a pixel drive circuit and a drive method therefor, and a display panel.

Embodiments of the present disclosure provide a pixel drive circuit, including: a drive module; a pulse modulation module configured to be enabled based on any one of a first scanning signal Scan1 and a second scanning signal Scan2, convert a data drive signal Data into a modulation signal of a drive current, and provide the modulation signal to the drive module; and a light-emitting device. The drive module is connected to the pulse modulation module and the light-emitting device, to control on-off of the drive current based on the modulation signal to control the light-emitting device to emit light.

The embodiments of the present disclosure further provide a timing control method for a pixel drive circuit, applied to the pixel drive circuit described above. A drive cycle of the pixel drive circuit comprises a plurality of sub-periods; and the timing control method includes a data pulse width modulation (PWM) timing control method and a data pulse amplitude modulation (PAM) timing control method. The data PWM timing control method includes: in each of the sub-periods, triggering, by the first scanning signal Scan1, pulses; in odd-numbered sub-periods, triggering, by the second scanning signal Scan2, pulses, and skipping triggering, by the data drive signal Data, pulses; and in each of the odd-numbered sub-periods, triggering, by the second scanning signal Scan2, the pulses before the first scanning signal Scan1; and in even-numbered sub-periods, skipping triggering, by the second scanning signal Scan2, pulses, and triggering, by the data drive signal Data, pulses; and in each of the even-numbered sub-periods, triggering, by the data drive signal Data and the first scanning signal Scan1, the pulses simultaneously. The data PAM timing control method includes: in each of the sub-periods, triggering, by the data drive signal Data and the first scanning signal Scan1, the pulses simultaneously; in the odd-numbered sub-periods, triggering, by the second scanning signal Scan2, the pulses; and in each of the odd-numbered sub-periods, triggering, by the second scanning signal Scan2, the pulses before the first scanning signal Scan1; and in the even-numbered sub-periods, skipping triggering, by the second scanning signal Scan2, the pulses.

The embodiments of the present disclosure further provide a timing control method for a pixel drive circuit, applied to the pixel drive circuit described above. A drive cycle of the pixel drive circuit comprises N sub-periods, wherein N is a natural number greater than or equal to 2. The timing control method includes: in each sub-period within first N−1 sub-periods, triggering, by the data drive signal Data and the first scanning signal Scan1, pulses simultaneously, and triggering, by the second scanning signal Scan2, pulses after the data drive signal Data and the first scanning signal Scan1; and in an $N^{th}$ sub-period, triggering, by the data drive signal Data and the first scanning signal Scan1, the pulses simultaneously, and skipping triggering, by the second scanning signal Scan2, the pulses.

The embodiments of the present disclosure provide a display panel, wherein the display panel includes the pixel drive circuit described above.

BRIEF DESCRIPTION OF DRAWINGS

To describe the technical solutions in the embodiments of the present disclosure more clearly, the following briefly describes accompanying drawings required for describing the embodiments. Apparently, the accompanying drawings in the following description show merely some embodiments of the present disclosure, and a person skilled in the art may still derive other drawings from these accompanying drawings without creative efforts.

REFERENCE NUMERALS

Figure 1:
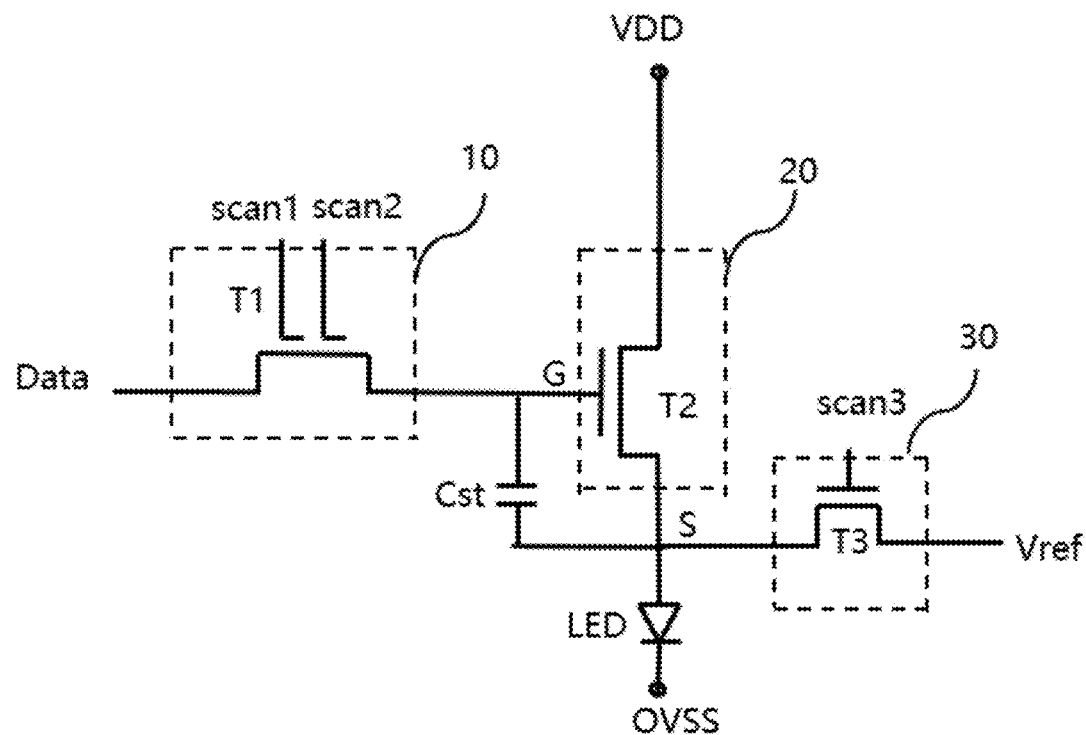
FIG. 1 is a pixel drive circuit diagram according to Embodiment 1 of the present disclosure.

10—Pulse modulation module, 20—Drive module, and 30—Detection module

DETAILED DESCRIPTION OF PREFERRED EMBODIMENTS

The following clearly and completely describes technical solutions in the embodiments of the present disclosure with reference to the accompanying drawings in the embodiments of the present disclosure. Apparently, the described embodiments are some embodiments rather than all the embodiments of the present disclosure. All other embodiments obtained by a person skilled in the art based on the embodiments of the present disclosure without creative efforts shall fall within the protection scope of the present disclosure.

In addition, in the specification, and claims of the present disclosure, terms "first" and "second" are intended to distinguish between different objects but do not indicate a particular order. Terms "include", "have", and any variations thereof are intended to cover a non-exclusive inclusion. Because a source and a drain of a transistor used in the present disclosure are symmetrical, the source and the drain of the transistor are interchangeable. According to shapes in the accompanying drawings, a middle end of the transistor is a gate, a signal input end is the source, and an output end is the drain.

Many different implementations or examples are provided below to implement different structures of the present disclosure. To simplify the present disclosure, components and settings of specific examples are described below. Certainly, they are merely examples, and are not intended to limit the present disclosure. In addition, in the present disclosure, reference numerals and/or reference letters may be repeated in different examples. The repetition is for the purposes of simplification and clearness, and a relationship between various discussed implementations and settings is not indicated.

Currently, to implement pulse hybrid modulation (PHM) hybrid drive in the pixel drive circuit, different voltages are required to be converted into different currents of a light-emitting device, and additional transistors are required to be added to turn on a drive transistor for a period of time and then pull a point G down to a low potential to turn off the drive transistor, to implement a pulse width modulation (PWM) function.

Because space of a layout is limited, and a development trend of a future product of a Micro LED display panel is that the pitch continues to shrink, the circuit is required to be simplified to be compatible with a size requirement of a smaller pitch.

To simplify PHM drive while being compatible with the size requirement of the smaller pitch, the embodiments of the present disclosure provide a pixel drive circuit and a timing control method therefor.

A light-emitting device that can be driven by the pixel circuit provided in the embodiments of the present disclosure may be a mini LED or a Micro LED.

Embodiment 1

Referring to FIG. 1, the present embodiment of the present disclosure provides a pixel drive circuit, including a drive module 20, a pulse modulation module 10, and a light-emitting device LED. The pulse modulation module 10 is configured to be enabled based on any one of a first scanning signal Scan1 and a second scanning signal Scan2, convert a data drive signal Data into a modulation signal of a drive current, and provide the modulation signal to the drive module 20. The drive module 20 is connected to the pulse modulation module 10 and the light-emitting device LED, to control on-off of the drive current based on the modulation signal to control the light-emitting device LED to emit light. The pulse modulation module 10 includes a dual-gate transistor T1. The dual-gate transistor T1 includes a first gate, a second gate, a first electrode, and a second electrode. The first gate receives the first scanning signal Scan1, the second gate receives the second scanning signal Scan2, the first electrode receives the data drive signal Data, and the second electrode is connected to the drive module 20.

In some embodiments, the drive module 20 includes a drive transistor T2, and the drive transistor T2 includes a gate, a first end, and a second end.

The gate of the drive transistor T2 is connected to the second electrode of the dual-gate transistor T1, the first end of the drive transistor T2 receives a voltage signal VDD, and the second end of the drive transistor T2 is connected to the light-emitting device LED.

In the embodiment shown in FIG. 1, the drive transistor T2 is an N-type transistor. The dual-gate transistor T1 is also an N-type dual-gate transistor.

A drain of the dual-gate transistor T1 receives the data drive signal Data, and electrons flow in from the drain of the dual-gate transistor T1. A source of the dual-gate transistor T1 is connected to the gate (point G) of the drive transistor T2, and a source of the drive transistor T2 is connected to the light-emitting device LED.

In some embodiments, the pixel drive circuit further includes a storage capacitor Cst, a first end of the storage capacitor Cst is connected to the gate of the drive transistor T2, and the other end of the storage capacitor Cst is connected to the source of the drive transistor T2.

In some embodiments, as shown in FIG. 1, the pixel drive circuit further includes a detection module 30, the detection module 30 is connected to the drive module 20 and the light-emitting device LED, and the detection module 30 is configured to be enabled based on a third scanning signal Scan3, to provide a reference signal Vref to the drive module 20 for compensation and detect a threshold voltage Vth of the drive module 20.

As shown in FIG. 1, the detection module 30 includes a detection transistor T3, a gate of the detection transistor T3 receives the third scanning signal Scan3, a first end of the detection transistor T3 is connected to the reference signal Vref, and a second end of the detection transistor is connected to the drive module 20 and the light-emitting device LED.

In the present embodiment, the detection transistor T3 is an n-type transistor, a drain of the detection transistor T3 is connected to the source of the drive transistor T2, and a source of the detection transistor T3 is connected to the reference voltage Vref.

The pixel drive circuit provided in the present embodiment can implement functions of PHM hybrid drive and external compensation. The dual-gate transistor T1 can play a role of turning on/off a TFT and discharging the TFT. The dual-gate transistor T1 inputs the data drive signal Data to the point G and maintains a potential through the storage capacitor Cst. The dual-gate transistor T1 can also pull down the point G to a low potential and turn off the drive transistor T2 after the drive transistor T2 is turned on for a period of time, to implement a PWM function.

The drive transistor T2 is a driving TFT, which converts different voltages into different currents of the light-emitting device LED, to implement a pulse amplitude modulation (PAM) function.

The detection transistor T3 plays a role of resetting a potential of a point S and detecting a threshold voltage Vth of the drive transistor T2 outside the point S.

The dual-gate transistor T1 may be turned on or turned off by receiving the first scanning signal Scan1 or the second scanning signal Scan2.

In a first stage, when the first scanning signal Scan1 or the second scanning signal Scan2 is at a high level, and the third scanning signal Scan3 is at a high level, both the dual-gate transistor T1 and the detection transistor T3 are turned on, and the reference voltage Vref is provided to the source (point S) of the drive transistor T2 through the turned-on detection transistor T3. The reference voltage Vref is at a low level. If Vref is 0 V, the source of the drive transistor T2 is 0 V. When the data drive signal Data received by the dual-gate transistor T1 reaches the point G through the turned-on dual-gate transistor T1, a voltage at the point G is equal to a voltage VData of the data drive signal Data. In this case, a voltage difference Vgs between a gate voltage and a source voltage of the drive transistor T2 is greater than the threshold voltage Vth of the drive transistor T2, so that the drive transistor T2 is turned on.

In a second stage, a potential of the point S is raised by increasing the reference voltage Vref. When the voltage difference between the gate and the source of the drive transistor T2 is equal to the threshold voltage Vth of the drive transistor T2, the drive transistor T2 is turned off, and the reference voltage Vref is charged to Vs. In this case, the threshold voltage Vth=VData−Vs, so that the threshold voltage Vth of the drive transistor T2 can be detected through the detection transistor T3. An objective of detecting the threshold voltage Vth is to adjust the voltage of the data drive signal Data, eliminate a problem of uneven luminance caused by different threshold voltages of different drive transistors T2 in the entire display panel, to achieve a compensation effect.

Figure 3:
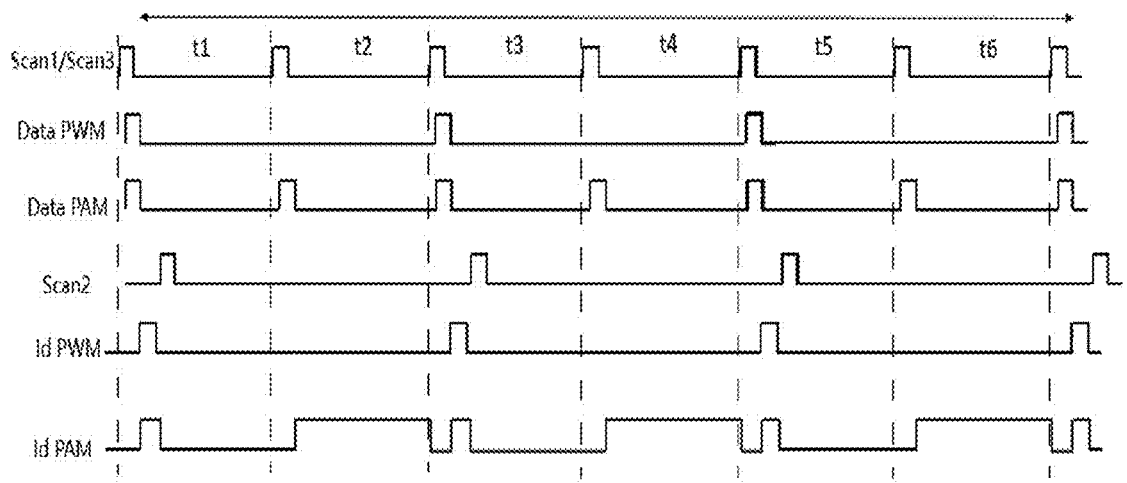
FIG. 3 is a timing control diagram of the pixel drive circuit diagram according to Embodiment 1 of the present disclosure.

FIG. 3 is a timing control diagram of the pixel drive circuit diagram according to Embodiment 1. The present embodiment provides a timing control method for a pixel drive circuit, applied to the pixel drive circuit provided in the foregoing implementations. A drive cycle of the pixel drive circuit includes a plurality of sub-periods.

The timing control method includes a data PWM timing control method and a data PAM timing control method.

The data PWM timing control method includes following steps.

In each of the sub-periods, the first scanning signal triggers a pulse.

In odd-numbered sub-periods, the second scanning signal triggers pulses, and the data drive signal Data does not trigger pulses; and in each of the odd-numbered sub-periods, the second scanning signal triggers the pulses before the first scanning signal.

In even-numbered sub-periods, the second scanning signal Scan2 does not trigger pulses, and the data drive signal Data triggers pulses; and in each of the even-numbered sub-periods, the data drive signal Data and the first scanning signal trigger the pulses simultaneously.

The data PAM timing control method includes following steps.

In each of the sub-periods, the data drive signal and the first scanning signal trigger the pulses simultaneously.

In the odd-numbered sub-periods, the second scanning signal triggers the pulses; and in each of the odd-numbered sub-periods, the second scanning signal triggers the pulses before the first scanning signal; and in the even-numbered sub-periods, the second scanning signal Scan2 does not trigger the pulses.

In the present embodiment, one drive cycle corresponds to 6 sub-periods. One drive cycle corresponds to duration of each frame of a display panel.

In a sensing stage (Vth detection), for the timing control method, refer to an existing 4T1C drive circuit, and details are not described again in the present disclosure.

Figure 2:
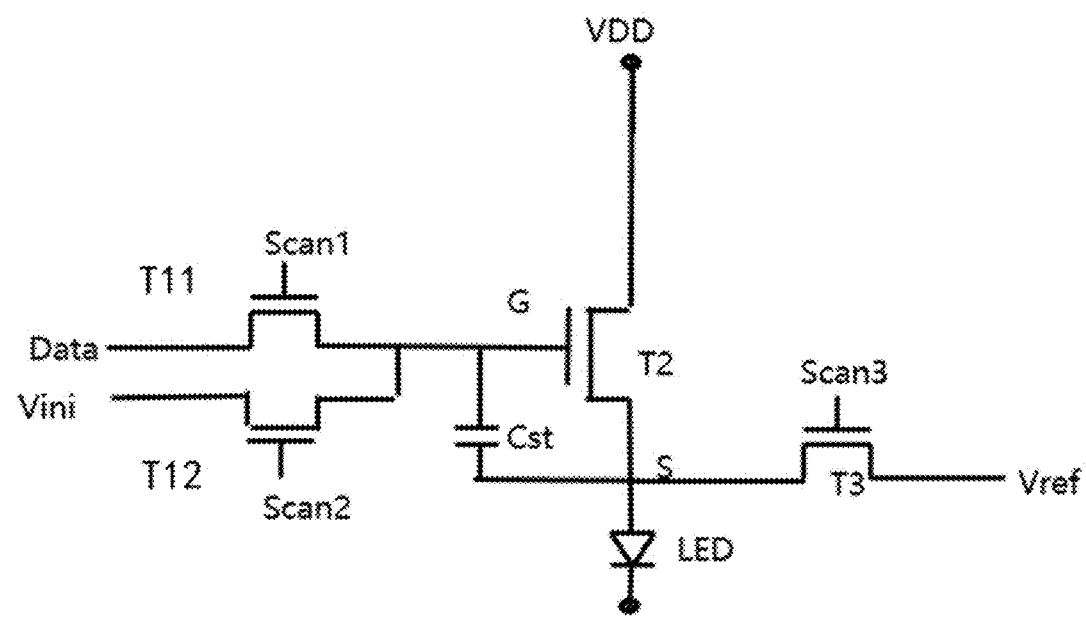
FIG. 2 is a schematic diagram of a pixel drive circuit using two TFTs to control a turn-on degree and turn-off time of a drive transistor respectively.

For timing in a drive stage (that is, a light-emitting display stage), refer to FIG. 2. There are two timing for high grayscale and low grayscale: Data PWM timing and Data PAM timing.

After the dual-gate transistor T1 is turned on through the second scanning signal Scan2, the data drive signal Data inputs a low potential to the point G. In this case, the drive transistor T2 is turned off and the LED stops emitting light. PWM light-emitting time can be controlled by controlling Scan2 timing.

The pixel circuit provided in the embodiments of the present disclosure may be described by a 4T1C duty-type drive circuit as an example, but is not limited to a duty-type or subframe-type.

In the pixel drive circuit of the display panel, the "duty-type" and "subframe-type" are two common drive modes, which are used for controlling luminance and a display effect of a pixel.

Duty-type drive: The Duty-type drive is a common drive mode for controlling luminance of a pixel. In the duty-type drive, duration (also referred to as a "duty cycle") of a drive current for each pixel is fixed, usually as a part of a drive cycle. For example, for ⅛ duty-type drive, the duration of the drive current for each pixel is ⅛ of a drive cycle. By adjusting the duration of the drive current, a luminance level of the pixel may be controlled.

Subframe-type drive: The subframe-type drive is a drive mode for displaying a dynamic image or video. In the subframe-type drive, one frame of image is divided into a plurality of subframes (subframes), and each of the subframes includes different image data. By changing a drive current of a pixel in each of the subframes, an animation effect or video playback can be implemented. Duration of each of the subframes is usually same, while a quantity of the subframes and content of the subframes are adjusted as required.

The application of such two drive modes in the display panel may be selected according to a specific requirement and design. The duty-type drive is suitable for static image display and can control the luminance level by adjusting the duty cycle. The subframe-type drive is suitable for dynamic image or video display, and can implement the animation effect by changing drive currents of pixels in different subframes.

The pixel drive circuit provided by the embodiments of the present disclosure can implement functions (as shown in FIG. 2) of two transistors to originally control a turn-on degree and turn-off time of the drive transistor T2 respectively by using the dual-gate transistor T1. The first gate of the dual-gate transistor T1 inputs a high signal of the data drive signal Data to the point G, and the second gate inputs a low signal of the data drive signal Data to the point G. In this way, a PHM function can be finally implemented, and a circuit structure can be simplified, to achieve an objective of increasing a limit pitch. Because the number of TFTs decreases and space required for a layout is reduced, a Micro LED (MLED) productization requirement of a smaller pitch can be supported.

Further, the pixel circuit provided by the embodiments of the present disclosure can implement an external compensation function.

In the present embodiment, the pixel drive circuit uses 3T1C to implement a same effect of PHM and external compensation of conventional 4T1C. However, a current minimum pitch of 4T1C of MLED can only support 0.6× mm, and the development trend of the MLED future product is that the pitch continues to shrink. The present embodiment simplifies the circuit and is compatible with a size requirement of a smaller pitch.

It should be noted that, in some embodiments, thin film transistors in the drive module 20, the pulse modulation module 10, and the detection module 30 may also be P-type transistors. Because the P-type transistors are turned on at a low level, corresponding timing signals change.

Embodiment 2

Figure 4:
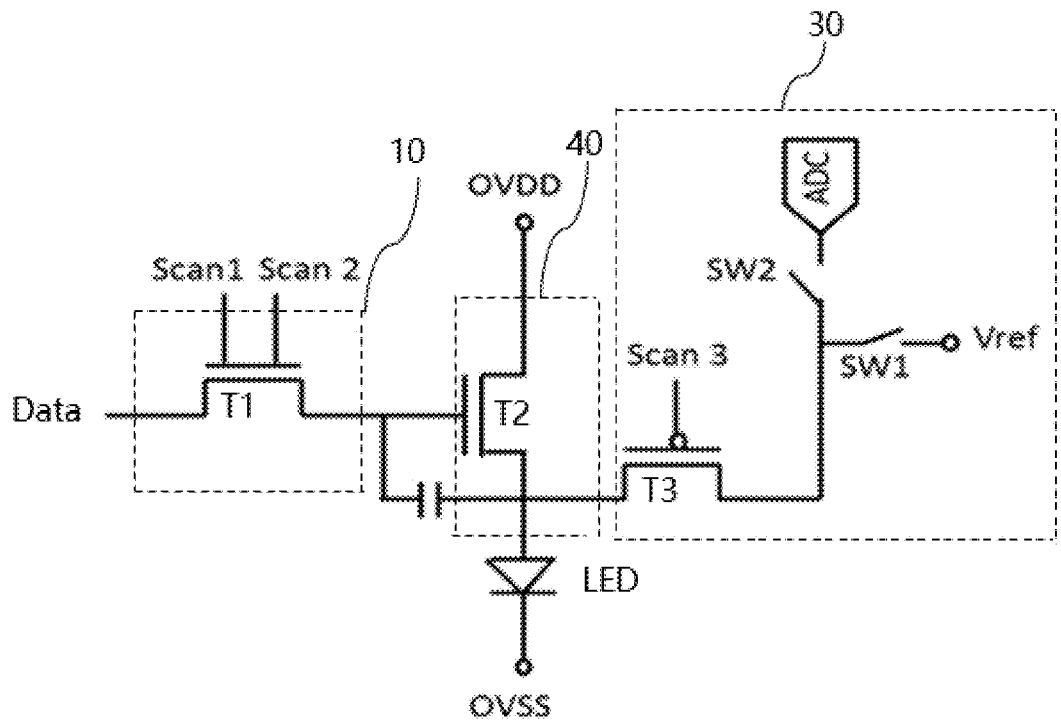
FIG. 4 is a pixel drive circuit diagram according to Embodiment 2 of the present disclosure.

Referring to FIG. 4, the present embodiment provides a pixel drive circuit, including a drive module 20, a pulse modulation module 10, and a light-emitting device LED. The pulse modulation module 10 is configured to be enabled based on any one of a first scanning signal and a second scanning signal, convert a data drive signal into a modulation signal of a drive current, and provide the modulation signal to the drive module 20.

The drive module 20 is connected to the pulse modulation module 10 and the light-emitting device LED, to control on-off of the drive current based on the modulation signal to control the light-emitting device to emit light.

A detection module 30 is connected to the drive module 20 and the light-emitting device LED, and the detection module 30 is configured to be enabled based on a third scanning signal, to provide a reference signal to the drive module 20 for compensation and detect a threshold voltage Vth of the drive module 20.

The pulse modulation module 10 includes a dual-gate transistor T1, the drive module 20 includes a drive transistor T2, and the detection module 30 includes a detection transistor T3, a first switch SW1, a second switch SW2, and an ADC analog-to-digital converter. The pixel drive circuit further includes a storage capacitor Cst and the light-emitting device LED.

A first gate of the dual-gate transistor T1 receives a first scanning signal Scan1, a second gate of the dual-gate transistor T1 receives a second scanning signal Scan2, a drain of the dual-gate transistor T1 receives the data drive signal Data, and a source of the dual-gate transistor T1 is connected to a gate (point G) of the drive transistor T2. A drain of the drive transistor T2 is connected to a power supply VDD, the source (point S) of the drive transistor T2 is connected to the light-emitting device LED, and the storage capacitor Cst is connected between the gate and the source of the drive transistor T2. A gate of the detection transistor T3 is connected to a third scanning signal line Scan3, a drain of the detection transistor T3 is connected to the source of the drive transistor T2, a source of the detection transistor T3 is connected to the reference voltage Vref through the first switch, and the source of the detection transistor T3 is connected to the ADC analog-to-digital converter through the second switch.

The pixel drive circuit provided by the present embodiment uses subframe-type drive. For timing in a drive stage (that is, a light-emitting display stage), refer to FIG. 5.

The present embodiment provides a timing control method for a pixel drive circuit, applied to the pixel drive circuit provided in the foregoing embodiments. A drive cycle of the pixel drive circuit includes N sub-periods, wherein N is a natural number greater than or equal to 2.

The timing control method includes following steps.

In each of preceding (N−1) sub-periods, the data drive signal Data and the first scanning signal trigger pulses simultaneously, and the second scanning signal triggers pulses after the data drive signal Data and the first scanning signal.

In an Nth sub-period, the data drive signal and the first scanning signal trigger the pulses simultaneously, and the second scanning signal does not trigger the pulse.

In the timing control method provided by the embodiment of the present disclosure, the preceding (N−1) sub-periods are used for PWM, and the Nth sub-period is used for PAM.

Figure 5:
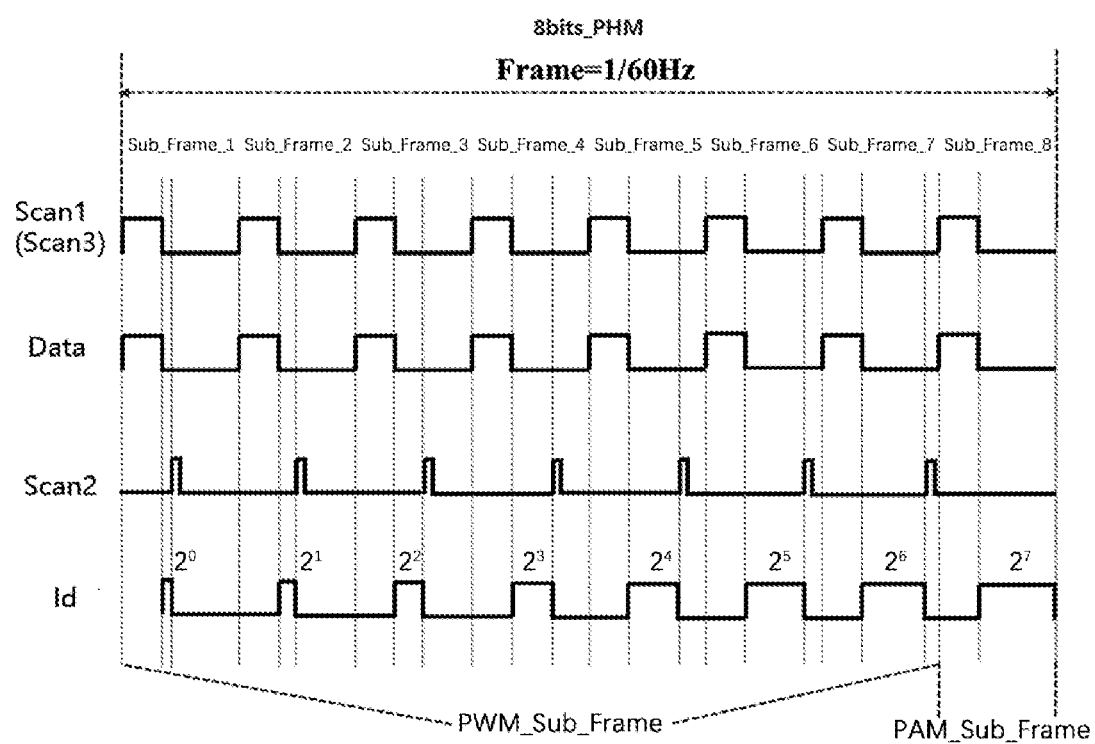
FIG. 5 is a timing control diagram of a pixel drive circuit according to Embodiment 2 of the present disclosure.

As shown in FIG. 5, one frame is divided into 8 subfields, that is, PHM drives a total of 8 subfields.

Low grayscale: Grayscale cutting (a first subfield to a seventh subfield) is performed based on lighting duration.

In a detailed implementation: the first subfield to the seventh subfield are combined to create 128 linear gammas, from which 32 points are selected to form gamma 2.2 grayscale. The number of PWM segmented grayscale is limited.

High grayscale: Grayscale cutting (an eighth subfield) is performed by an amplitude of the data drive signal Data.

Note: a light emission is performed only in the eighth subfield, and a light emission duty is only ⅛.

According to the pixel drive circuit provided by the embodiments of the present disclosure, duty-type or subframe-type PHM drive can be implemented, which has a simple structure and can support the MLED productization requirement of the smaller pitch.

Embodiment 3

The present embodiment provides a display panel, and the display panel includes the foregoing pixel drive circuit.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of the present disclosure specifically and in detail, but cannot be construed as a limitation to the patent scope of the present disclosure. It should be noted that a person of ordinary skill in the art may make various changes and improvements without departing from the ideas of the present disclosure, which shall all fall within the protection scope of the present disclosure. Therefore, the protection scope of this patent present disclosure is subject to the protection scope of the appended claims.

What is claimed is:

1. A pixel drive circuit, comprising:
   a drive module;
   a pulse modulation module configured to be enabled and disenabled based on a first scanning signal and a second scanning signal, to convert a data drive signal into a modulation signal of a drive current, and provide the modulation signal to the drive module, wherein the modulation signal is a pulse width modulation signal or a pulse amplitude modulation signal; and
   a light-emitting device,
   wherein the drive module is connected to the pulse modulation module and the light-emitting device, to control on-off of the drive current based on the modulation signal to control the light-emitting device to emit light;
   the pulse modulation module comprises a dual-gate transistor;
   the dual-gate transistor comprises a first gate, a second gate, a first electrode, and a second electrode; and
   the first gate receives the first scanning signal, the second gate receives the second scanning signal, the first electrode receives the data drive signal, and the second electrode is connected to the drive module;
   wherein the drive module comprises:
   a drive transistor, wherein the drive transistor comprises a gate, a first end, and a second end; and
   wherein the gate of the drive transistor is connected to the second electrode, the first end receives a voltage signal, and the second end is connected to the light-emitting device;
   wherein the pixel drive circuit further comprises a storage capacitor, wherein two ends of the storage capacitor are electrically connected to the gate and the second end of the drive transistor respectively;
   wherein a drive cycle of the pixel drive circuit comprises N sub-periods, wherein N is a natural number greater than or equal to 2;
   wherein the pulse modulation module is configured to, in each sub-period of preceding N−1 sub-periods, perform data pulse width modulation, convert the data drive signal into the pulse width modulation signal, and provide the pulse width modulation signal to the drive module; the pulse modulation module is configured to, in an $N^{th}$ sub-period, perform data pulse amplitude modulation, convert the data drive signal into the pulse amplitude modulation signal, and provide the pulse amplitude modulation signal to the drive module.

2. The pixel drive circuit as claimed in claim 1, wherein the dual-gate transistor is an N-type dual-gate transistor.

3. The pixel drive circuit as claimed in claim 1, wherein the pixel drive circuit further comprises a detection module, and the detection module is connected to the drive module and the light-emitting device, and the detection module is configured to be enabled based on a third scanning signal, to provide a reference signal to the drive module for compensation and detecting a threshold voltage of the drive module.

4. The pixel drive circuit as claimed in claim 3, wherein the detection module comprises a detection transistor, wherein a gate of the detection transistor receives the third scanning signal, a first end of the detection transistor receives the reference signal, and a second end of the detection transistor is connected to the drive module and the light-emitting device.

5. The pixel drive circuit as claimed in claim 1, wherein the pixel drive circuit further comprises a detection module, and the detection module comprises a detection transistor, a first switch, a second switch, and an ADC analog-to-digital converter; and
   a gate of the detection transistor receives a third scanning signal, a first end of the detection transistor receives a reference voltage through the first switch, the first end of the detection transistor is connected to the ADC analog-to-digital converter through the second switch, and a second end of the detection transistor is connected to the drive module and the light-emitting device.

6. A display panel, comprising a pixel drive circuit, wherein the pixel drive circuit comprises:
   a drive module;
   a pulse modulation module configured to be enabled and disenabled based on a first scanning signal and a second scanning signal, to convert a data drive signal into a modulation signal of a drive current, and provide the modulation signal to the drive module, wherein the modulation signal is a pulse width modulation signal or a pulse amplitude modulation signal; and
   a light-emitting device,
   wherein the drive module is connected to the pulse modulation module and the light-emitting device, to control on-off of the drive current based on the modulation signal to control the light-emitting device to emit light;
   the pulse modulation module comprises a dual-gate transistor;
   the dual-gate transistor comprises a first gate, a second gate, a first electrode, and a second electrode; and
   the first gate receives the first scanning signal, the second gate receives the second scanning signal, the first electrode receives the data drive signal, and the second electrode is connected to the drive module;
   wherein the drive module comprises:
   a drive transistor, wherein the drive transistor comprises a gate, a first end, and a second end; and
   wherein the gate of the drive transistor is connected to the second electrode, the first end receives a voltage signal, and the second end is connected to the light-emitting device;
   wherein the pixel drive circuit further comprises a storage capacitor, wherein two ends of the storage capacitor are electrically connected to the gate and the second end of the drive transistor respectively;
   wherein a drive cycle of the pixel drive circuit comprises N sub-periods, wherein N is a natural number greater than or equal to 2;
   wherein the pulse modulation module is configured to, in each sub-period of preceding N−1 sub-periods, perform data pulse width modulation, convert the data drive signal into the pulse width modulation signal, and provide the pulse width modulation signal to the drive module; the pulse modulation module is configured to, in an $N^{th}$ sub-period, perform data pulse amplitude modulation, convert the data drive signal into the pulse amplitude modulation signal, and provide the pulse amplitude modulation signal to the drive module.

7. The display panel as claimed in claim 6, wherein the dual-gate transistor is an N-type dual-gate transistor.

8. The display panel as claimed in claim 6, wherein the pixel drive circuit further comprises a detection module, and the detection module is connected to the drive module and the light-emitting device, and the detection module is configured to be enabled based on a third scanning signal, to provide a reference signal to the drive module for compensation and detecting a threshold voltage of the drive module.

9. The display panel as claimed in claim 8, wherein the detection module comprises a detection transistor, wherein a gate of the detection transistor receives the third scanning signal, a first end of the detection transistor receives the reference signal, and a second end of the detection transistor is connected to the drive module and the light-emitting device.

10. The display panel as claimed in claim 6, wherein the pixel drive circuit further comprises a detection module, and the detection module comprises a detection transistor, a first switch, a second switch, and an ADC analog-to-digital converter; and a gate of the detection transistor receives a third scanning signal, a first end of the detection transistor receives a reference voltage through the first switch, the first end of the detection transistor is connected to the ADC analog-to-digital converter through the second switch, and a second end of the detection transistor is connected to the drive module and the light-emitting device.

* * * * *